Aug. 15, 1944.   G. B. GALLASCH   2,355,910
OPTICAL INSTRUMENT
Filed May 22, 1943   5 Sheets-Sheet 1

GEORGE B. GALLASCH
INVENTOR
BY
ATTORNEYS

FIG.2

GEORGE B. GALLASCH
INVENTOR

Aug. 15, 1944.    G. B. GALLASCH    2,355,910
OPTICAL INSTRUMENT
Filed May 22, 1943    5 Sheets-Sheet 3

GEORGE B. GALLASCH
INVENTOR
BY
ATTORNEYS

Aug. 15, 1944. G. B. GALLASCH 2,355,910
OPTICAL INSTRUMENT
Filed May 22, 1943 5 Sheets-Sheet 4

GEORGE B. GALLASCH
INVENTOR
BY
ATTORNEYS

FIG. 13

Patented Aug. 15, 1944

2,355,910

UNITED STATES PATENT OFFICE 2,355,910

OPTICAL INSTRUMENT

George B. Gallasch, Rochester, N. Y., assignor to Bausch & Lomb Optical Company, Rochester, N. Y., a corporation of New York Application May 22, 1943, Serial No. 488,067

17 Claims. (Cl. 33—147)

This invention relates to optical instruments and more particularly to measuring or gaging devices of such type wherein indication of the dimension measured is given by optical means.

Devices heretofore used in the measuring instrument field embodying optical systems have been of the comparator type which are adapted to accurately determine size relationships such as the height or diameter of a measured part with respect to a standard size or dimension. These devices are highly efficient and accurate in their comparison of the dimension of a workpiece with respect to a standard size or dimension.

Although advantageous in the performance of this desirable function, these comparators are very limited in their range of measurement, due to the extremely close tolerances that are employed in comparing the standard size or dimension to the dimension of a workpiece and denoting the extent of deviation between the two dimensions. The range of measurement is generally of the extent of four thousandths of an inch, plus or minus, and the standard size or dimension may limit deviations of the dimension of the workpiece to a hundred thousandth or to a millionth of an inch, plus or minus. When such minute tolerances are had, it is necessary to limit the range of measurement very closely to insure accuracy in the comparison. Therefore, these comparators cannot be used for measurement of a workpiece where it is desired to secure the actual dimensional measurement of the workpiece over four thousandths of an inch. Also, the comparators are extremely sensitive, due to the delicate and accurate measurements required, so that they must be continually checked by a skilled workman, using Johansson blocks or other measurement standard, to insure accuracy in the proper functioning of the operating mechanism.

Ordinary micrometers and gaging devices of the hand-operated type are accurate in giving measurements, but require manipulation by a skilled workman and need frequent comparison to a measurement standard to insure their uniform performance.

These limitations apparent in comparators and micrometers are obviated in the device embodying the present invention. In addition to performing all the functions of measurement of a comparator, the device need not be limited to the narrow range of measurement of a comparator and does not require comparison with respect to a standard size or dimension for accurately determining size relationship between the height or diameter of the measured part with that of the standard. The device can accurately measure the actual dimension of a workpiece and secure fractional parts thereof to six or more decimal places, if desired. Also, once the device is placed in condition for use, the simple and rugged structure of the device will permit accurate measurements to be obtained continuously without frequent comparison to a standard size or dimension for insurance of maximum performance. The device is superior to ordinary micrometers and gaging devices of the hand operated type, in that, an unskilled person may readily operate the machine and the device does not need frequent comparison to a measurement standard to insure uniform performance.

These advantages, over comparators and other measuring devices heretofore used, are attained in the present invention by providing a device having a gauge member having a workpiece engaging member and a main scale. This scale, for the purpose of illustration, is adapted to have a range of measurement of three inches of a dimension of a workpiece. To secure fractional measurements to ten thousandths of an inch, a separate subdividing or vernier scale is used to subdivide the fractions on the main scale; the two scales being cooperatively adjustable to secure accurate measurements of unit and fractional denominations of the workpiece. When the main scale and its cooperating workpiece engaging member are accurately positioned, along with the optical elements within the device, to a standard size or dimension, at the factory, the device will give accurate readings for different workpieces having variable dimensions, without comparison to a standard size or dimension or other adjustment of the device, by permitting the measured dimensions of the workpiece to be shown on a screen in inches and fractions of an inch in its true dimensional measurement. In this manner, the device may be used as a comparator by determining whether the calculated dimension of the workpiece conforms to the limits of tolerances. Although the scales of the device are calibrated in ten thousandths of an inch, they may be readily converted to still higher fractional measurements, in that, the indices on the main and subdividing scales may be graduated by further subdivisions of the scales.

The device is substantially built, in that, it has no delicate mechanism that requires frequent checking with a measurement standard to perform its accurate measurement function, as is necessary to the proper functioning of the gauging devices of the comparator and micrometer type. The device may be easily and readily checked by an unskilled operator for accurate measurements by permitting the workpiece engaging point to contact the anvil and noting the position of the zero graduation on the vertical main scale relative to the fiducial or index lines above the horizontal vernier scale on the screen. The zero graduation on the main scale should be positioned between the horizontal fiducial or index lines above the vernier scale and the vertical fiducial or index line should pass over the zero graduation of the horizontal vernier scale. If the above results are not obtained, the adjustable workpiece engaging point may be rotated to allow the point to be raised or lowered to bring about the aforesaid positions of the graduations on the scales and their cooperating fiducial or index lines on the screen.

In the operation of the device, the operator positions a workpiece on an anvil and in alignment with the workpiece engaging point; pushes a button to permit the point to contact the workpiece; views the screen; rotates a handwheel to align a graduation on the main scale between the two fiducial or index lines above the vernier scale on the screen; reads the numbers of the main scale on the left side of the screen disposed between two shadow portions and the numbers on the vernier scale denoted by the fiducial or index line on a graduation of the vernier scale; pulls a chain to raise the point from the workpiece and removes the measured workpiece. The operator may easily determine which of two graduations on the main scale, denoting symbols of measurement, will be the correct graduation indicating measurement of the dimension of the workpiece, by rotating the handwheel to position the fiducial or index lines on the vernier scale in alignment with the graduations on the main scale. When there is a fractional subdivision of the numbers on the main scale, the operator will be able to position a graduation between the lines only in one instance and therefore, will know the numbers adjacent the graduation positioned between the two lines as being a measurement value of the dimension of the workpiece. Thus, an unskilled person may readily operate the machine and quickly determine the accurate measurement of the workpiece by reading the numbers indicated on the projected image of the main scale and the numbers denoting fractional subdivisions of the numbers on the main scale indicated on the projected image of the subdividing or vernier scale. To prevent confusion to an unskilled person in determining the numbers representing the measurement, a split shadow is projected on the screen for occluding numbers on the image of the main scale above or below the numbers denoting a correct measurement value of the dimension of the workpiece.

Thus, the dimension measuring device of the present invention can accurately ascertain precision measurements, denoting the actual dimension of a workpiece, in a ready and efficient manner and permit the calculated dimension of the measured workpiece to be instantly and easily read by the user.

An important object of the present invention is to provide a novel dimension measuring instrument which utilizes an optical system for indication of the dimension measured.

Another object of the invention is to provide a novel dimension measuring instrument having an optical system to project enlarged images of scales on a screen for giving a visual indication of the dimension measured.

A further object is to provide means for measuring the dimension of a work specimen which utilizes separate cooperating scales for indicating unit and fractional measurements of the dimension measured.

A still further object of the invention is to provide means for visually occluding numbers on a screen non-indicative of the dimension measured.

Another object of the invention is to provide a novel dimension measuring instrument which will be relatively simple in structure, yet accurate, convenient and efficient in operation.

These and other objects and advantages reside in certain novel features of construction, arrangement and combination of parts as will hereinafter be more fully described and pointed out in the appended claims.

Referring to the drawings.

A preferred embodiment of my invention is shown in the drawings wherein the instrument frame consists of a base 10, a standard 11, and a hollow housing generally indicated at 12 for containing the mechanical and optical elements comprising the measuring apparatus. A semicircular plate 13 is removably fastened to the housing 12 in a vertical position and has an opening therein for holding a translucent screen 14. The housing 12 has a cover 15 enclosing its top portion and which may be removed for access to the measuring apparatus. Mounted upon the cover 15, there is secured a lamp enclosure 16 in which is located a light source or lamp 17 having an electric conductor 18 extending therefrom. A switch button 19 is located on the base 10 for closing and opening an electric circuit for the energization of the lamp 17. A flanged member 20 secured to the lamp enclosure 16, has an opening therein for receiving a hollow tube 21 extending within the housing 12. A plurality of lenses, forming a condensing lens system 21', are fixedly secured in the open ends of the bore of the tube 21. It is readily apparent that the light rays emitted from the lamp 17 will pass through the tube 21 and the lenses contained therein.

A work anvil 22, mounted on the base 10, is adapted to receive a workpiece 23 thereon for measurement. A workpiece engaging member or gauge point 24, attached to a gauge member or rod 25, is located above and in a direct line with the workpiece 23. Overhanging the base supporting the work anvil 22 there is a support 26 in the housing 12 on which is secured a gauge rod bearing and lock mechanism or assembly 27 by means of screws 28.

Figures 4, 6, 9:
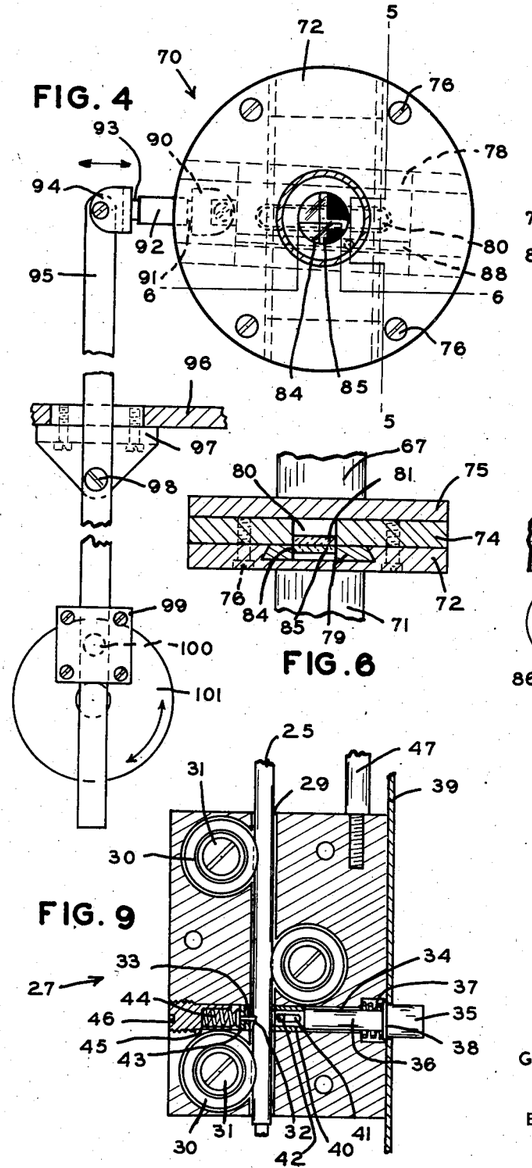
Fig. 4 is a vertical sectional view of the micrometer slide mechanism on the line 4—4 of Fig. 3, looking in the direction of the arrows.
Fig. 6 is a sectional view taken on the line 6—6 of Fig. 4.
Fig. 9 is a detail view of the locking and bearing mechanism in section.
Figure 5:
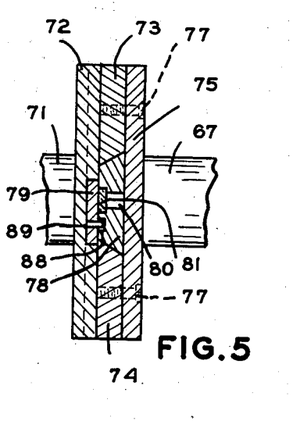
Fig. 5 is a sectional view taken on the line 5—5 of Fig. 4.

Referring to Fig. 9, there is shown a bore 29 extending vertically through the bearing and lock assembly 27 for receiving the gauge member or rod 25. The assembly 27 has three openings within it adapted to receive bearings 30. Bearings 30 are mounted in the assembly 27 by screws 31 and are freely rotatable thereon. The bearings 30 have grooved peripheral portions adapted to receive and guidingly engage the rod 25 preventing lateral movement but allowing longitudinal movement within the bore 29 of the assembly 27. The gauge rod 25 has a notch 32 in its lower portion for engagement by a locking pin 33. A bore 34 is disposed transversely of the gauge rod 25 in the assembly 27 to receive a push button 35 having a rod 36 integral therewith. A spring 37, for maintaining the push button in an outward position, is located between a flange 38 of the button 35 and a recessed portion in the assembly 27. A plate 39 is screwed to the front of the machine and is contacted by the flange 38 preventing a displacement of the rod 36 by confining the rod in the recessed portion of the assembly 27. A sleeve 40, adjacent the end of the rod 36, has a slot 41 therein adapted to receive a pin 42 mounted in the wall of the bore 34 of the assembly 27 for guiding movement of the rod 36. The sleeve 40 has a vertical opening extending therethrough for permitting sufficient clearance for the passage of the rod 25 in the bore 29 at all times. The end of the sleeve 40 is adapted to contact a pin member 43 having the locking pin 33 thereon. Located behind the pin member 43 there is a spring 44 adapted to be held within an opening 45 in a screw 46 for urging the pin 33 into engagement with the notch 32. The screw is held in a threaded opening in the end of the bore 34. As can be seen from this lock assembly, and with the gauge rod 25 in its normal position as shown in Fig. 2, the push button 35 is pushed inwardly contacting the sleeve 40 which, in turn, will contact the pin member 43 and force the pin 33 out of engagement with the notch 32, allowing the gauge rod 25 to descend until the work engaging member 24 touches the workpiece 23.

A transparent main scale, having visible graduated markings thereon in the form of spaced numerals and graduations, is indicated at 48 and is attached to the gauge rod 25 by means of a coupling member 49, a sleeve member 50 and a guide member 51. The member 51 is guidingly engaged by a shaft 47, mounted on the assembly 27, for insuring proper alignment of the scale 48 and gauge rod 25. The guide member 51 has an opening 52 therein to allow passage of a chain 53. A leaf spring 54, clamped to the member 51, extends under the same and is formed with an opening for receiving and retaining therein a bead of the chain 53 as shown in Fig. 2.

Figure 2:
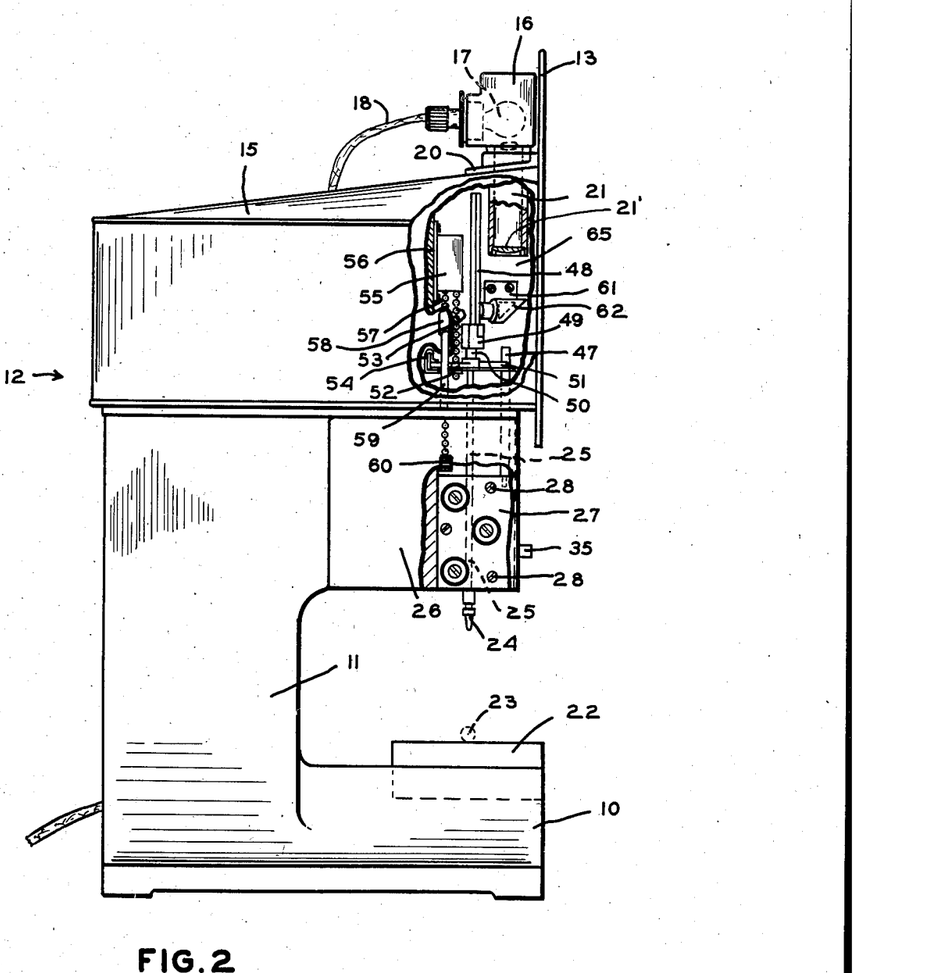
Fig. 2 is a side elevation of the dimension measuring instrument, with parts in section.

Referring to Fig. 2, the numeral 55 indicates a clockwork mechanism secured to a wall of the housing 12 by means of a plate 56 and screws as shown, and has depending therefrom the chain 57, which passes through the chain 53 as well as the chain 57, which passes through a coupling 58 and a tube 59 mounted in an adjacent wall, to a position outside of the housing where its pendant 60 may be grasped by the operator. The clockwork mechanism 55 is adapted to allow free upward movement of the gauge member 25 and the scale 48, and their coupling and guide members, so that an operator may rapidly raise the same by pulling the chain 57 downwardly. When these members are raised to the position shown in Fig. 2, or their normal position, they are locked by engagement of the notch 32 and the pin 33 for maintaining them in a raised position until the button 35 is pushed, at which time the clockwork mechanism will allow the gauge rod 25 and its associated scale member 48 to gravitate slowly downward to rest upon the work specimen. A dashpot or similar device may be substituted for the clockwork mechanism for performing this operation.

Figure 3:
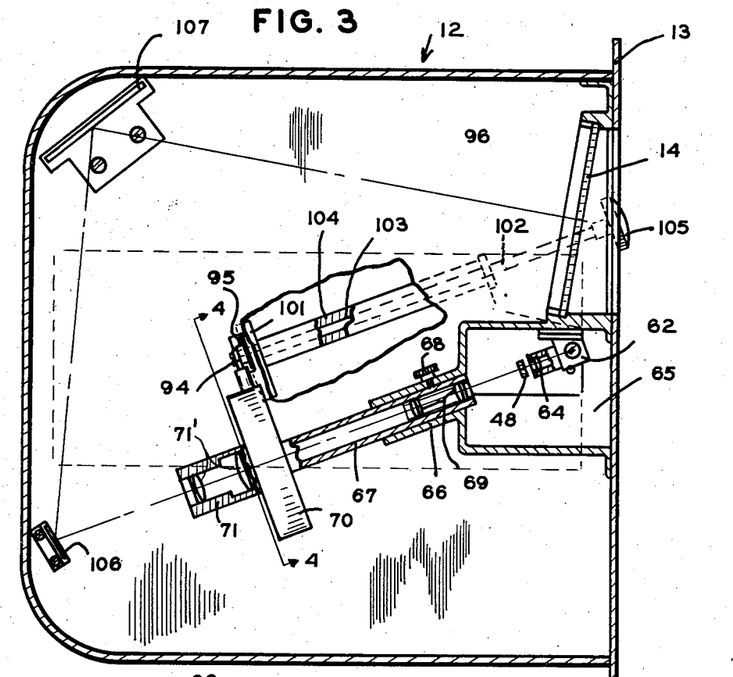
Fig. 3 is a top plan view of the instrument, partly in section and partly in elevation, with the cover removed.

Referring to Figs. 2 and 3, mounted upon a wall of the casing 12 is a bracket 61 attached to a prism holder 62 in which is secured a prism 63. The prism holder 62 has a tube extending horizontally towards the scale 48 for confining the light rays reflected by the prism 63 through a condensing lens 64 mounted therein onto and through the scale 48. The condensing lens system 21' will transmit the rays emitted from the lamp 17 to the prism 63. The prism 63 will reflect the rays through the condenser lens 64 to illuminate a portion of the indicia on the scale 48 indicating a measurement value of the dimension of the workpiece. A chamber 65 houses the mechanical and optical elements just described.

The walls of the chamber 65 extend outwardly therefrom to form a tubular extension 66 adapted to slidably receive a tube 67. A thumb screw 68, inserted into a threaded opening in the tubular extension 66, is used to clamp the tube 67 in any desired adjusted position within the extension 66. The tube 67 is secured to a casing 70 and has mounted therein an objective lens system 69 for a purpose to be later described. Fastened to the other side of the casing 70 is a tube 71, the bore of which is aligned with the bore of the tube 67. The tube 71 carries a plurality of lenses which as will hereinafter be more fully explained, form a projecting system 71'.

The micrometer measuring means for subdividing the units and fractions of the main scale comprise two transparent plates containing indicia thereon of a subdividing or vernier scale and cooperating fiducial or index lines, and a micrometer slide mechanism to shift these measuring elements relative to one another. Referring to Figs. 4, 5, 6, and 7, this slide mechanism comprises a circular plate 72, two substantially semicircular plates 73 and 74, and a circular plate 75. The plate 72 is fastened to one side of the plates 73 and 74 by screws 76. The plate is fastened to the other side of the plates by screws 77. The plates 73 and 74 are spaced apart a distance sufficient to receive a slide member 78. A slide member 79 is mounted within a vertical groove formed in the plate 72. The plates 72 and 75 have openings to receive the tubes 67 and 71. The slide member 78 is positioned parallel to and closely adjacent the member 79.

Figure 7:
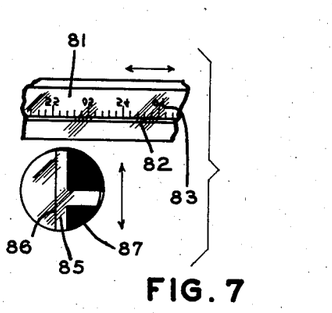
Fig. 7 is an exploded rear view of the micrometer measuring plates showing the shadow portion, the subdividing scale, and the fiducial or index lines.
Figure 10:
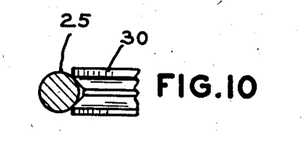
Fig. 10 is a detail view of the gauge member and a guiding bearing.

The adjacent marginal edges of the plates 73 and 74, forming the groove receiving the slide member 78, are so formed that the slide member 78 is movable in an oblique path relative to the horizontal axis of the micrometer slide mechanism. Referring now to Fig. 7, a plate 81 of glass, or other transparent material, is mounted within an opening 80 of the slide member 78 and so positioned therein that the exposed face thereof is substantially flush with the face of the slide member 78 adjacent the slide member 79. The exposed face of the plate 81 is provided with two fiducial or index lines 82 and a subdividing or vernier scale 83. The fiducial or index lines 82 and the vernier scale 83 are horizontally positioned on the plate 81. In the now preferred embodiment of the present invention, the vernier scale is graduated from 0 to 100 to afford the desired subdivision of the unit and fractional measurements indicated by the main scale.

The slide member 79, operated in the vertical groove of the plate 72, is formed with an opening 84 in which is disposed a glass plate 85 having one face substantially flush with the face of its carrier member contiguous to the slide member 78. Referring to Fig. 7, the plate 85 is provided on its face contiguous to the slide member 78 with a vertical fiducial or index line 86 and a pair of opaque segments 87.

As the slide member 78 is held parallel to and closely adjacent the slide member 79, the plate 81 is contiguous to and substantially in facewise engagement with the plate 85. Thus, as the indicia of the plates are formed on the adjacent faces thereof the indicia can be said to occupy substantially a common plane. In the illustrated embodiment of the present invention, this plane is substantially coincident with the focal plane of the objective lens system 69.

The member 78 has a channel 88 formed therein substantially parallel with the axis of the groove formed between the plates 73 and 74. A pin 89, fixed to the member 79, is disposed within the channel 88 of the member 78 for slide movement therein. When the member 78 is moved in its groove, the pin 89, sliding in the channel 88, will cause the member 79 to slide in the vertical groove of the plate 72. The movement of the member 78, carrying the glass plate 81, results in a vertical as well as a horizontal displacement of the vernier scale 83 and the fiducial lines 82 formed on the plate 81, and also causes a vertical displacement of the plate 85 containing the opaque segments 87 and the fiducial or index line 86.

Figure 13:
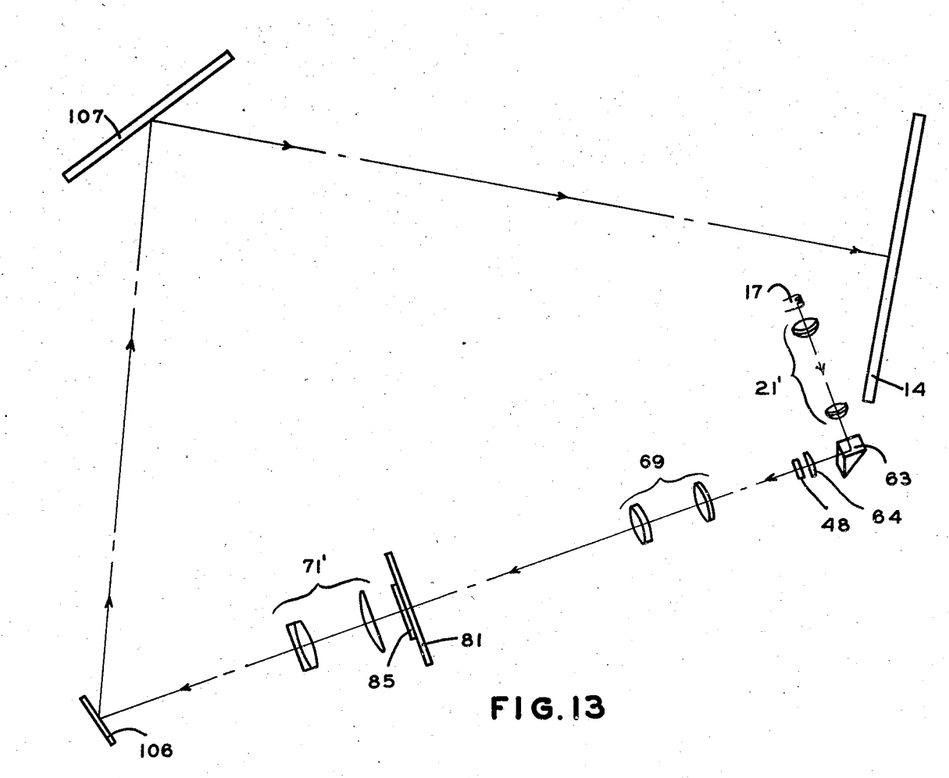
Fig. 13 is a diagrammatic view of the optical system and its relation to the main scale, the micrometer plates, and the screen.

Referring now to the optical system of the instrument shown in Figs. 3 and 13, light from the source 17, directed by means of the lens systems 21' and 64 and the reflecting prism 63, illuminates a portion of the indicia of the main scale 48. The objective lens system 69 forms an image of the illuminated indicia of the main scale 48 in a plane coincident with the plane of the indicia of the plates 81 and 85. As the indicia on the contiguous surfaces of the plates 81 and 85 lie in and are movable in a plane substantially coincident with the focal plane of the objective lens system, means, such as an eyepiece, can be used for forming a composite image of the illuminated indicia of the main scale 48 and the indicia of the plates 81 and 85. In the now preferred embodiment of the invention however, a composite image of the illuminated indicia of the main scale 48 and the indicia of the plates 81 and 85 is formed by the lens system 71' and projected by means of the mirrors 106 and 107 to the screen 14. The optical system of the instrument is such that the image of the measuring scales are normal on the screen 14 as viewed by the operator.

To determine the desired fractional subdivision of the numbers of the main scale imaged on the screen indicative of a measurement value of the dimension of the workpiece, the member 78 is moved to position the image of the fiducial lines 82 so that a graduation on the image of the main scale 48 is disposed between them.

Movement of the member 78 will horizontally shift the image of the vernier scale 83, on the screen 14, to bring a graduation thereon into coincidence with the image of the vertical fiducial line 86 on the screen, the graduation on the vernier scale image indicating numbers denoting a fractional subdivision of the numbers on the image of the main scale 48 on the screen indicative of a measurement value of the dimension of the workpiece.

In the embodiment of the invention now preferred, the member 78 is moved by means of a crank and lever mechanism shown in Figs. 3 and 4. The member 78 has a lug formed at one end thereof for connection to a swivel member 90. The swivel member 90 has an arm 91 connected by a sleeve 92 to an arm 93 of a swivel member 94. A lever 95 is connected to the swivel member 94. The lever 95 extends downwardly therefrom and passes through an opening in a floor 96 in the housing 21. A bracket 97 and pin 98 pivotally connects the lever 95 to the floor 96. The plates 99 are slidably mounted on the lever 95 and position the lever 95 between them. One of the plates has an opening for receiving a crank-pin 100 integral with a wheel 101. A shaft 102, attached to the wheel 101, is journaled in a bore 103 of a cylinder 104. The cylinder 104 is mounted in a wall of the standard 11 and prevents lateral movement of the shaft 103 when rotated by a hand wheel 105. This mechanism will be actuated by the rotation of the hand wheel 105 by the operator. Rotation of the hand wheel 105 rotates the shaft 102, the wheel 101 and the pin 100. Rotation of the pin 100 about the axis of the wheel 101 will cause the plates 99 to slide on the lever 95, and cause the lever 95 to oscillate due to its pivotal connection with the floor 96. The member 78 will be reciprocated in its groove by the movement of the swivel members 90 and 94 by the lever 95. By rotating the hand wheel 105, the operator thus moves the member 78 to adjust the indicia on the plate 81 to cause the image of the fiducial lines 82 on the screen to interpose a graduation of the main scale image between them, and to thereby bring about the resultant movements of the images of the measuring and occluding elements on the screen.

To prevent confusion of an operator in reading the numbers on the image of the main scale 48 on the screen 14 representing a measurement value of the dimension of the workpiece, means are provided in the present invention to occlude numbers on the image of the main scale nonindicative of a measurement value of the workpiece. These means comprise the opaque segments 87 on the plate 85 which will cast a split shadow on the image of the main scale 48 on the screen 14 to thereby occlude numbers thereon nonindicative of a measurement value of the workpiece.

Figures 1, 8:
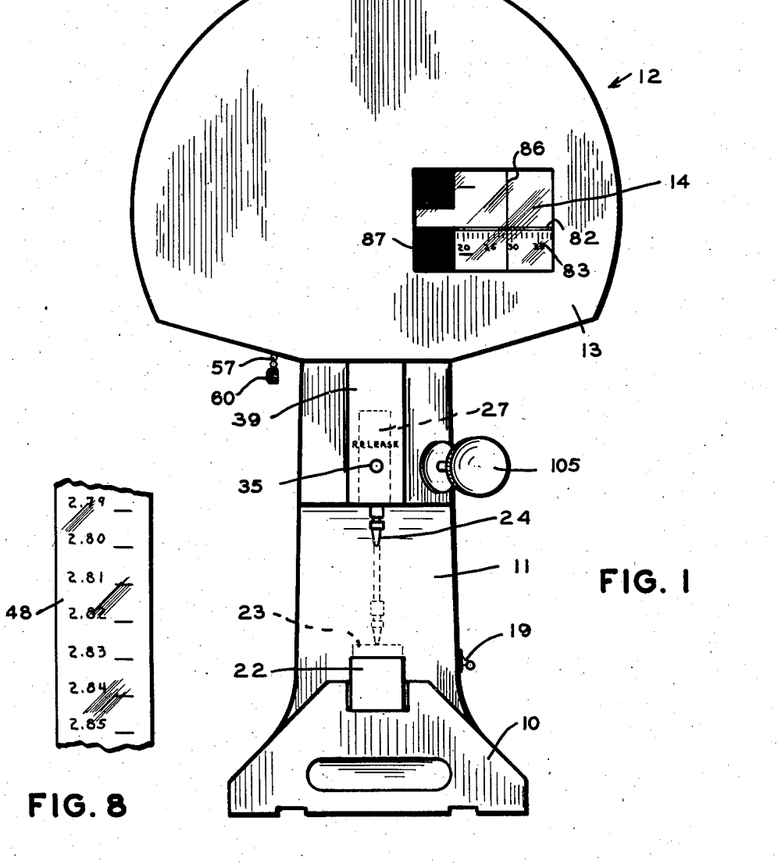
Fig. 1 is a front elevation of a dimension measuring instrument embodying my invention.
Fig. 8 is a partial front elevation of the main scale.
Figure 11:
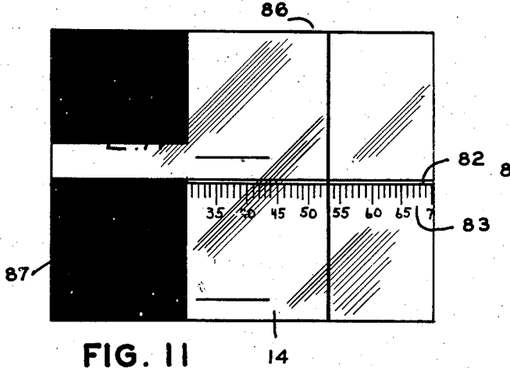
Fig. 11 is a diagrammatic view showing the positions of the projected scales and index lines before final reading, and the split shadow on the screen.
Figure 12:
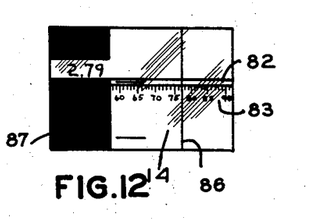
Fig. 12 is a diagrammatic view showing the positions of the projected scales and index lines for final reading, and the split shadow on the screen.

This desirable result is secured through the vertical movement imparted to the member 79 by the actuation of the member 78. The plate 85, moving vertically with the member 79, will cause the opaque segments 87 to cast a split shadow on the screen 14 to occlude numbers on the image of the main scale 48 nonindicative of a measurement value of the dimension of the workpiece. As can be seen in Figs. 1, 11, and 12, and due to the relative positions occupied by the opaque segments and the fiducial lines 82 on the plates 81 and 85 in the micrometer measuring mechanism, the image of the fiducial lines 82 on the screen 14 remains positioned adjacent and parallel to the upper edge of the lower shadow segment throughout their movements on the screen. Therefore, when the image of the graduation of the main scale is between the image of the fiducial lines 86, the numbers of the image of the main scale positioned adjacent the graduation will be between the shadow segments. The remaining numbers of the image of the main scale will be occluded by the shadow segments. The numbers on the image of the main scale appearing between the shadow segments on the screen represents a measurement value of a dimension of the workpiece.

The operator, by viewing the screen, can easily determine the measurement value of the dimension of the workpiece by noting the numbers on the image of the main scale positioned between the shadow segments and then noting the numerical reading of the image of the vernier scale indicated by the image of the fiducial line 86 coincident with a graduation on the image of the vernier scale 83. In the now preferred embodiment of the invention, the main scale 48 is graduated in numbers denoting inch units and fractional parts thereof, while the vernier scale 83 is graduated in numbers denoting fractional subdivisions of the numbers on the main scale. Therefore, to form a composite reading of inch units and fractions thereof denoting the measurement value of the dimension of the workpiece, the operator merely views the screen to read the numbers of the image of the main scale between the shadow segments denoting units and fractions thereof to a hundredth of an inch and the numbers indicated by the image of the fiducial line 86 on the image of the vernier scale 83 denoting fractional subdivisions of the numbers on the image of the main scale to ten thousandths of an inch, and determines the measurement value by placing these numbers in their obvious numerical sequence.

As the length of the subdividing or vernier scale 83 is graduated from 0 to 100, adjustment of the slide member 78 for the full length of the vernier scale will produce a movement of the image of the fiducial or index lines 82 on the screen to position a graduation of the image of the main scale 48 between them. The operator may readily determine which of two graduations on the image of the main scale 48 on the screen is determinative of a measurement value of the workpiece by noting the numbers indicated by the position of the image of the fiducial line 86 on a graduation of the vernier scale image. As it will be only possible to reach and interpose two graduations between the image of the fiducial lines 82, when there is no fractional subdivision of the numbers on the image of the main scale, the operator informed of that status and by reading the numbers on the vernier scale indicated by the coincidence with the fiducial line 86 and a graduation on the image of the vernier scale 83, will know that the 0 or 100 reading on the image of the vernier scale indicates that there is no fractional subdivision of the numbers adjacent the graduations of the image of the main scale 48 interposed between the image of the fiducial lines 82. In the case of the vernier scale reading 100, the operator will merely add 1 to the hundredths fraction of the number on the image of the main scale indicated to be a measurement value of the workpiece.

In cases where a fractional subdivision of the numbers on the image of the main scale exists, the operator will only be able to position one graduation of the image of the main scale between the image of the two fiducial lines 82, as the fiducial lines will be unable to reach the other graduation for positioning the graduation therebetween, due to the limits of travel imposed upon the image of the fiducial lines 82 by the slide member mechanism. In this manner, the operator can readily determine the correct measurement value of the dimension of the workpiece without confusion and with certainty in the evaluation of the numerical value of the workpiece dimension.

The advantages and features of the invention may be best appreciated by the mode of operation. Referring now to Fig. 2, there is shown a workpiece 23 on the anvil 22 directly below the gauge point 24. The release button 35 is pushed by the operator to release the gauge member 25 from the locking pin 33. The clockwork mechanism 55 then allows the gauge member 25 to slowly descend to permit the gauge point 24 to contact the workpiece 23. As the lamp 17 has been energized by closing an electric circuit by the switch button 19, the light rays from the lamp 17, directed by means of the lens systems 21' and 64 and the reflecting prism 63, illuminates a portion of the indicia of the main scale 48. Referring to Figs. 3 and 13, the objective lens system 69 forms an image of the illuminated indicia of the main scale 48 in a plane coincident with the plane of the indicia of the plates 81 and 85. A composite image of the illuminated indicia of the main scale 48 and the indicia of the plates 81 and 85 is formed by the lens system 71' and projected by means of the mirrors 106 and 107 to the screen 14. It will be presumed that the positions of the images of the measuring and shadow elements appearing on the screen 14, as viewed by the operator, will be the same as that shown in Fig. 11. The operator then rotates the hand wheel 105 to move the image of the fiducial lines 82 on the screen 14 to interpose a graduation of the image of the main scale 48 between them. By so doing, the slide members 78 and 79 will be actuated to shift the measuring and shadow elements on the plates 81 and 85 so that their images will also be shifted on the screen. By the same movement imparted to the slide members, the split shadow on the screen will move vertically to occlude members of the image of the main scale 48 nonindicative of a measurement value of the dimension of the workpiece. As a result, the numbers 2.79 will appear between the shadow segments on the screen. Also, the vernier scale image has moved horizontally to the image of the fiducial line 86 on the screen to bring one of its graduations into coincidence with the line 86. The graduation of the vernier scale image coincident with the line 86 will indicate a numerical value 77 and a measurement value of .0077 inch. The numbers indicated by the shadow segments on the image of the main scale will denote a unit and fractional inch measurement value of the dimension of the workpiece. The numbers indicated by the graduation on the vernier scale image represent a fractional subdivision of the numbers appearing on the image of the main scale, and also represent a fractional inch measurement value of the dimension of the workpiece. The operator, determining these two sets of numbers by the simple manipulation of the micrometer measuring means, readily perceives that the measurement value of the dimension of the workpiece is 2.7977 inches.

Although the index scales of the instrument, in the present embodiment of the invention, are graduated in inches, and fractions of inches to four decimal places, indicating measurements of inch units and fractional parts thereof to ten thousandths of an inch, they may be readily changed to other systems of measurements, for example, millimeters of the metric system. Also, due to the fact that there is no superposing of scales as evident in other types of instruments in common use, the indicia thereon may be graduated on the main and subdividing scales to secure further decimal places by further subdivision of the scales.

From the foregoing, it will be apparent that I am able to attain the objects of my invention and provide a new and improved dimension measuring instrument which is simple, efficient, and convenient and compact. Various modifications can, of course, be made without departing from the spirit of my invention and the scope of the appended claims.

I claim:

1. In a measuring instrument, a main scale; means for illuminating the indicia of said scale; means for moving said scale in accordance with the dimension of a workpiece to be measured; a lens system for forming an image of the illuminated indicia of said scale; fiducial means cooperative with the illuminated indicia of said main scale for indicating a measurement value of the dimension of the workpiece; a transparent subdividing scale mounted for movement in the focal plane of said lens system, said subdividing scale indicating fractional parts of a unit of measurement of said main scale; a screen; means for projecting images of the illuminated indicia of said scales and said fiducial means on said screen; and fiducial means adapted to cooperate with the image of an indicia of said subdividing scale for indicating a fractional measurement value of the dimension of said workpiece.

2. In a measuring instrument, a transparent main scale; means for illuminating the indicia of said scale; means for moving said scale in accordance with the dimension of a workpiece to be measured; a lens system for forming an image of the illuminated indicia of said scale; fiducial means cooperative with the illuminated indicia of said main scale for indicating a measurement value of the dimension of said workpiece; a transparent subdividing scale for indicating fractional parts of a unit of measurement of said main scale, said lens system superimposing an image of said illuminated indicia on said vernier scale; a screen; means for projecting a composite image of said scales and fiducial means on said screen in superposed relationship and fiducial means adapted to cooperate with the image of an indicia of said subdividing scale for indicating a fractional measurement value of the dimension of said workpiece.

3. In a measuring instrument, a scale; means for moving said scale in accordance with the dimension of a workpiece to be measured; means for illuminating the indicia of said scale; a lens system for forming an image of the illuminated indicia of said scale; fiducial means; opaque means, said lens system superimposing an image of the illuminated indicia on said fiducial means and said opaque means; and means for forming a composite image of said scale, fiducial means and opaque means for observation, the opaque means occluding the image of numbers of said scale other than the numbers indicated by the image of said fiducial means as being the measurement value of the dimension of said workpiece.

4. In a measuring instrument, a scale; means for moving said scale in accordance with the dimension of a workpiece to be measured; means for illuminating the indicia of said scale; a lens system for forming an image of the illuminated indicia of said scale; fiducial means mounted for movement in a plane substantially coincident with the focal plane of said lens system; opaque means movable by said fiducial means in the plane thereof; means for forming a composite image of said scale, fiducial means, and opaque means for observation; means for moving said fiducial means whereby the image thereof may be brought into coincidence with an image of an indicia of said scale, the opaque means moving relative to said fiducial means and occluding the image of the numbers of said scale other than the numbers indicated by the image of the fiducial means as being the measurement value of the dimension of said workpiece.

5. In a measuring instrument, a main scale, means for moving said scale in accordance with the dimension of a workpiece to be measured; means for illuminating the indicia of said scale; a lens system for forming an image of the illuminated indicia of said scale; a transparent subdividing scale with fiducial means, said subdividing scale indicating fractional parts of a unit of measurement of said main scale; opaque means, said lens system superimposing an image of said illuminated indicia on said vernier scale and said opaque means; means for forming a composite image of said scales and said fiducial means for observation, the image of the fiducial means of said subdividing scale cooperating with the image of a graduation of said main scale for indicating a measurement value of the dimension of said workpiece and the opaque means occluding the image of numbers of the main scale other than the numbers indicated by the image of said fiducial means of said subdividing scale as being a measurement value of the dimension of said workpiece; and fiducial means adapted to cooperate with the image of a graduation of said subdividing scale for indicating a fractional measurement value of the dimension of the workpiece.

6. In a measuring instrument, a main scale; means for moving said scale in accordance with a dimension of a workpiece; means for illuminating the indicia of said scale; a lens system for forming an image of the illuminated indicia of said scale; a subdividing scale with fiducial means mounted for movement in a plane substantially coincident with the focal plane of said lens system, said subdividing scale indicating fractional parts of a unit of measurement of said main scale; opaque means movable by said subdividing scale in the plane thereof; means for forming a composite image of said scales and said opaque means for observation; means for moving said subdividing scale whereby the image of the fiducial means of said subdividing scale may be brought into coincidence with the image of an indicia of said main scale, said opaque means occluding the image of numbers of the main scale other than the numbers indicated by the image of the fiducial means of said subdividing scale as being a measurement value of a dimension of the workpiece; and fiducial means adapted to cooperate with the image of a graduation of said subdividing scale for indicating a fractional measurement value of the dimension of said workpiece.

7. In a measuring instrument, a main scale; means for moving said scale in accordance with a dimension of a workpiece; means for illuminating the indicia of said scale; a lens system for forming an image of the illuminated indicia of said scale; a transparent subdividing scale with fiducial means mounted for movement in a plane substantially coincident with the focal plane of said lens system, said subdividing scale indicating fractional parts of a unit measurement of said main scale; opaque means with fiducial means movable by said subdividing scale in the plane thereof; means for forming a composite image of said scales and said opaque means for observation; means for moving said subdividing scale and said opaque means whereby the image of the fiducial means of said subdividing scale may be brought into coincidence with the image of an indicia of the main scale for indicating a measurement value of the dimension of said workpiece, the image of the fiducial means of said opaque means cooperating with the image of an indicia of said subdividing scale to indicate a fractional measurement of the dimension of the workpiece, said opaque means moving with the image of the fiducial means of said subdividing scale and forming a shadow for occluding the image of numbers of the main scale other than the numbers indicated by the image of the fiducial means of said vernier scale as being a measurement value of a dimension of the workpiece.

8. A gauging device of the character described comprising means for supporting a workpiece to be measured; means movably mounted on said device and adapted to engage said workpiece; a transparent member; a scale carried by said member indicating integral and fractional parts of units of measure; means for connecting said member to said movably mounted means for movement therewith; means for illuminating the indicia of said scale; a lens system for forming an image of the illuminated indicia of said scale; a second transparent member; a scale carried by said second member indicating fractional parts of a unit of measurement of said main scale; fiducial means carried by said second member and adapted to cooperate with an illuminated indicia of said first-named scale for indicating a measurement value of the dimension of said workpiece; means for mounting said second member for movement in a plane substantially coincident with the focal plane of said lens system; a screen; and means for projecting images of the illuminated indicia of said scales and said fiducial means on said screen; and fiducial means adapted to cooperate with an indicia of said second-named scale for indicating a fractional measurement value of the dimension of said workpiece.

9. A gauging device of the character described comprising a support; gauge means for engaging a workpiece on said support and movable in accordance with a dimension of said workpiece; a transparent main scale; means for connecting said scale to said gauge means for movement therewith; means for illuminating the indicia of said scale; a lens system for forming an image of the illuminated indicia of said scale; a transparent subdividing scale with fiducial means, said subdividing scale indicating fractional parts of a unit of measurement of said main scale, said subdividing scale mounted for movement in the focal plane of said lens system with said lens system superimposing an image of said illuminated indicia on said subdividing scale; a screen; means for projecting a composite image of said scales on said screen in superposed relationship; means for moving said subdividing scale to bring the image of the fiducial means thereof into coincidence with the image of a graduation of said main scale for indicating a measurement value of the dimension of said workpiece; and fiducial means cooperative with the image of an indicia of said subdividing scale for indicating a fractional measurement value of the dimension of said workpiece.

10. A gauging device of the character described comprising a support; gauge means for engaging a workpiece on said support and movable in accordance with a dimension of said workpiece; a transparent main scale; means for connecting said scale to said gauge means for movement therewith; means for illuminating the indicia of said scale; a lens system for forming an image of the illuminated indicia of said scale; a transparent subdividing scale with fiducial means, said subdividing scale indicating fractional parts of a unit of measurement of said main scale and cooperable therewith for indicating the measurement value of the dimension of said workpiece; a transparent member with fiducial means; means for movably mounting said subdividing scale and said member in facewise relationship with the indicia thereon in a plane substantially coincident with the focal plane of said lens system; means for connecting said transparent member to said subdividing scale for movement thereby; a screen; means for projecting a composite image of said scales and fiducial means on said screen in superposed relationship; and means for moving said subdividing scale to bring the image of the fiducial means thereof into coincidence with the image of a graduation of said main scale for indicating a measurement value of the dimension of said workpiece, the image of the fiducial means of said member indicating a fractional measurement value of the dimension of said workpiece on the image of the subdividing scale.

11. A gauging device of the character described comprising a support; gauge means for engaging a workpiece on said support and movable in accordance with a dimension of said workpiece; a transparent main scale; means for connecting said scale to said gauge means for movement therewith; means for illuminating the indicia of said scale; a lens system for forming an image of the illuminated indicia of said scale; a transparent subdividing scale with fiducial means, said subdividing scale indicating fractional parts of a unit of measurement of said main scale; a transparent member with opaque means; means for movably mounting said subdividing scale and said member in facewise relationship with the indicia thereon in a plane substantially coincident with the focal plane of said lens system; means for connecting said transparent member to said subdividing scale for movement thereby; a screen; means for projecting a composite image of said scales, fiducial means and said opaque means on said screen in superposed relationship; means for moving said subdividing scale to bring the image of the fiducial means thereof into coincidence with the image of a graduation of said main scale, for indicating a measurement value of the dimension of said workpiece the opaque means moving relative to said subdividing scale and forming a shadow on the screen occluding the images of the numbers of the main scale other than the numbers associated with the graduation indicated by the image of the fiducial means of said subdividing scale as being a measurement value of the dimension of said workpiece and fiducial means adapted to cooperate with the image of an indicia of said subdividing scale for indicating a fractional measurement value of the dimension of said workpiece.

12. A gauging device of the character described comprising a support; gauge means for engaging a workpiece on said support and movable in accordance with a dimension of said workpiece; a transparent main scale; means for connecting said scale to said gauge means for movement therewith; means for illuminating the indicia of said scale; a lens system for forming an image of the illuminated indicia of said scale; a transparent subdividing scale with fiducial means; a slide member horizontally mounting said subdividing scale and said fiducial means for movement in a plane substantially coincident with the focal plane of the lens system; a transparent member with fiducial means; a second slide member for mounting said transparent member for movement with the fiducial means in a vertical plane substantially coincident with the focal plane of the lens system, said second slide member being held parallel to and closely adjacent said first-named slide member, the transparent member having its indicia disposed contiguous to said subdividing scale indicia in facewise relationship; means for connecting said second slide member to said first-named slide member for movement thereby, said first-named slide member movable in an oblique path and said second slide member movable in a vertical path in planes parallel to the focal plane of said lens system; a screen; means for projecting a composite image of said scales and fiducial means on said screen in superposed relationship; and means for moving said first-named slide member and said second slide member, said first-named slide member moving the fiducial means of said subdividing scale image vertically into coincidence with a graduation of said main scale image and the image of said subdividing scale horizontally to bring a graduation thereon into coincidence with the image of the fiducial means of said transparent member, the vertical and horizontal movements of the subdividing scale and the fiducial means being a compound resultant of the oblique movement of the first-named slide member, the image of the fiducial means of said transparent member indicating a fractional measurement value of the dimension of said workpiece on the image of the subdividing scale.

13. A gauging device of the character described comprising a support; gauge means for engaging a workpiece on said support and movable in accordance with a dimension of said workpiece; a transparent main scale; means for connecting said scale to said gauge means for movement therewith; means for illuminating the indicia of said scale; a lens system for forming an image of the illuminated indicia of said scale; a transparent subdividing scale with fiducial means; a slide member horizontally mounting said subdividing scale and said fiducial means for movement in a plane substantially coincident with the focal plane of the lens system; a transparent member with fiducial means and opaque means; a second slide member for mounting said transparent member for movement with the fiducial means and opaque means in a vertical plane substantially coincident with the focal plane of the lens system, said second slide member being held parallel to and closely adjacent said first-named slide member, the transparent member having its indicia disposed contiguous to said subdividing scale indicia in facewise relationship; means for connecting said second slide member to said first-named slide member for movement thereby, said first-named slide member movable in an oblique path and said second slide member movable in a vertical path in planes parallel to the focal plane of said lens system; a screen; means for projecting a composite image of said scales, fiducial means and opaque means on said screen in superposed relationship; and means for moving said first-named slide member and said second slide member, said first-named slide member moving the fiducial means of said subdividing scale image vertically into coincidence with a graduation of said main scale image and the image of said subdividing scale horizontally to bring a graduation thereon into coincidence with the image of the fiducial means of said transparent member, the vertical and horizontal movements of the subdividing scale and the fiducial means being a compound resultant of the oblique movement of the first-named slide member, the image of the fiducial means of said transparent member indicating a fractional measurement value of the dimension of said workpiece on the image of the subdividing scale, the opaque means moving relative to said subdividing scale and forming a shadow on the screen occluding the image of the numbers of the main scale other than the numbers associated with the graduation indicated by the image of the fiducial means of said subdividing scale as being a measurement value of the dimension of the workpiece.

14. A gauge device of the character described comprising a support; a workpiece engaging element; gauge means movable in said support in accordance with the movements of said element; a transparent main scale; means for connecting said scale to said gauge means for movement therewith; means for locking said gauge member against movement; means for releasing said gauge member to permit downward movement to contact the workpiece; means for guiding said gauge member; means for controlling the rate of descent of said gauge member; means for illuminating the indicia of said scale indicative of the dimension of the workpiece; a lens system for forming an image of the illuminated indicia of said scale; a transparent subdividing scale with fiducial means, said subdividing scale indicating fractional parts of a unit of measurement of said main scale and cooperable therewith for indicating the measurement value of the dimension of said workpiece; a transparent member with fiducial means; means for movably mounting said subdividing scale and said member in facewise relationship with the indicia thereon in a plane substantially coincident with the focal plane of said lens system; means for connecting said transparent member to said subdividing scale for movement thereby; a screen; means for projecting a composite image of said scales and fiducial means on said screen in superposed relationship; and means for moving said subdividing scale to bring the image of the fiducial means thereof into coincidence with the image of a graduation of said main scale for indicating a measurement value of the dimension of said workpiece, the image of the fiducial means of said member indicating a fractional measurement value of the dimension of said workpiece on the image of the vernier scale.

15. A gauge device of the character described comprising a support; a workpiece engaging element; gauge means movable in said support in accordance with the movements of said element; a transparent main scale; means for connecting said scale to said gauge means for movement therewith; means for locking said gauge member against movement; means for releasing said gauge member to permit downward movement to contact the workpiece; means for guiding said gauge member; means for controlling the rate of descent of said gauge member; means for illuminating the indicia of said scale indicative of the dimension of the workpiece; a lens system for forming an image of the illuminated indicia of said scale; a transparent subdividing scale with fiducial means, said subdividing scale indicating fractional parts of a unit of measurement of said main scale and cooperable therewith for indicating the measurement value of the dimension of said workpiece; a transparent member with fiducial means and opaque means; means for movably mounting said subdividing scale and said member in facewise relationship with the indicia thereon in a plane substantially coincident with the focal plane of said lens system; means for connecting said transparent member to said subdividing scale for movement thereby; a screen; means for projecting a composite image of said scales, fiducial means and said opaque means on said screen in superposed relationship; and means for moving said subdividing scale to bring the image of the fiducial means thereof into coincidence with the image of a graduation of said main scale for indicating a measurement value of the dimension of said workpiece, the image of the fiducial means of said member indicating a fractional measurement value of the dimension of said workpiece on the image of the subdividing scale, the opaque means moving relative to said subdividing scale and forming a shadow on the screen occluding the images of the numbers of the main scale other than the numbers associated with the graduation indicated by the image of the fiducial means of said subdividing scale as being a measurement value of the dimension of said workpiece.

16. In a measuring instrument, means for holding a workpiece; gauge means movably mounted on said instrument and having a workpiece engaging element and a scale connected thereto; means for guiding said gauge means for axial movement; means for locking said means against movement in a raised position; release means for permitting downward movement of said gauge means to contact the workpiece; mechanism for retarding downward movement of said gauge means; and means for raising said gauge means to a position wherein said locking means is operative to hold said gauge means in the raised position whereby said measured workpiece may be removed from said holding means and another workpiece inserted in the holding means for measurement.

17. A gauge device of the character described comprising a support; gauge means for engaging a workpiece on said support and movable in accordance with a dimension of said workpiece; a main scale; means for connecting said scale to said gauge means for movement therewith; means for illuminating the indicia of said scale; a lens system for forming an image of the illuminated indicia of said scale; opaque means; fiducial means; means for movably mounting said opaque means and said fiducial means in a plane substantially coincident with the focal plane of said lens system; a screen; means for projecting a composite image of said scale, opaque means and fiducial means on said screen in superposed relationship; and means for moving said opaque means and said fiducial means to bring the image of the fiducial means into coincidence with the image of a graduation on said main scale for indicating the measurement value of the dimension of said workpiece, the opaque means moving relative to said fiducial means and occluding the image of the indicia of said scale other than the indicia indicated by the image of the fiducial means as being the measurement value of the dimension of said workpiece.

GEORGE B. GALLASCH.